UNITED STATES PATENT OFFICE.

JOHANNES MOHLER AND CARL A. MAYER, OF BASLE, SWITZERLAND, ASSIGNORS TO L. DURAND HUGUENIN & CO., OF SAME PLACE.

BLUE DYE.

SPECIFICATION forming part of Letters Patent No. 451,502, dated May 5, 1891.

Application filed February 25, 1891. Serial No. 382,759. (Specimens.) Patented in Germany July 23, 1889, No. 50,998; in England July 25, 1889, No. 11,848, and in France July 27, 1889, No. 199,850.

*To all whom it may concern:*

Be it known that we, JOHANNES MOHLER and CARL ALEXIS MAYER, citizens of Switzerland, residing at Basle, Switzerland, have invented new and useful Improvements in the Production of a Blue Coloring-Matter or Dye-Stuff for Dyeing and Printing, (for which we have received Letters Patent in Germany, dated July 23, 1889, No. 50,998; in France, dated July 27, 1889, No. 199,850; and in England, dated July 25, 1889, No. 11,848,) of which the following is a specification.

In United States Letters Patent No. 420,164, dated January 28, 1890, there is mentioned in lines seventy-eight (78) to eighty-four (84) one sulpho-acid which is obtained by the action of fuming sulphuric acid, twenty-four per cent., (sulphuric acid containing twenty-four per cent. of anhydrous sulphuric acid,) at a low temperature upon the coloring matter or substance claimed in the above-mentioned patent.

Since the above-named patent was issued we have discovered that another sulpho-acid can be produced by combining the above-named coloring matter or substance with ordinary sulphuric acid containing, preferably, ninety to ninety-five per cent. of monohydrated acid, but no anhydrous (fuming) sulphuric acid, at a temperature of 80° centigrade. By mixing the coloring-matter with such ordinary sulphuric acid and maintaining the above-named temperature long enough by means of a water bath or in any other suitable manner the whole of the original dye-stuff above named becomes transformed into a sulpho-acid, which is readily soluble in alkaline solutions.

From the foregoing description it is perfectly clear that this new sulpho-acid differs entirely from the one described in the above-mentioned patent, both in the process of its production and in its properties. The latter is produced at a low temperature by the action of fuming sulphuric acid, twenty-four per cent., on the dye-stuff or substance claimed in the above-mentioned patent, while the new sulpho-acid is produced at a comparatively high temperature (80° centigrade) by the action of ordinary sulphuric acid containing, preferably, ninety to ninety-five per cent. monohydrated acid, but no anhydrous or fuming acid, on the same substance. Further, the new sulpho-acid is insoluble in acidulated water, only slightly soluble in pure cold water, and with difficulty in boiling water. When used in a slightly-acidulated bath, it dyes fibers blue shades, which are far brighter and bluer than those obtained with indulines, whereas the sulpho-acid produced by the action of fuming sulphuric acid, as described in the above-named patent, is far more soluble in water, either acidulated or not, and the shades obtained on fibers in dyeing are grayer and weaker than those obtained with the new sulpho-acid.

To produce the new sulpho-acid practically we proceed as follows: One part of the dye-stuff described in United States Letters Patent No. 420,164, dated January 28, 1890, produced by the action of the hydrochloride of nitroso-dimethylaniline upon the condensation product of tannin with aniline, is poured at the ordinary temperature into four parts of ordinary sulphuric acid containing, preferably, about ninety to ninety-five per cent. of monohydrated acid. During this operation the mixture is continually stirred, and when the whole quantity of dye-stuff is dissolved the temperature is slowly raised to 80° centigrade and maintained at that point until a few drops of the mixture diluted with pure water produces a precipitate, which, when filtered and treated with boiling alkaline water, is wholly soluble in the latter. When such is found to be the case, the new sulpho-acid has been formed, and the heating is then discontinued, the mixture cooled down, and the whole of it then poured upon a large quantity of ice, by which means the new sulpho-acid is precipitated in a finely-divided crystalline form.

As this sulpho-acid is not soluble in cold acidulated water, all the excess of sulphuric acid is easily removed by filtering and repeated washings with water.

This sulpho-acid may be used for dyeing either as a free acid in the form of a paste containing it in the above-mentioned finely-divided crystalline condition and having a metallic brown appearance or else in combination with an alkali, as a salt, in the form of a dark bluish powder without metallic luster and readily soluble in water.

Having thus described our invention, what we claim as new, and desire to secure by Letters Patent, is—

As a new article, the sulpho-acid derived from tannin, aniline, and nitroso-dimethyl-aniline having the form of a dark crystalline powder insoluble in acidulated water, but slightly soluble in pure cold water, and with difficulty soluble in boiling water, and combined with alkalies it forms salts that are readily soluble in either warm or cold water.

In testimony whereof we have hereunto set our hands in the presence of two subscribing witnesses.

JOHANNES MOHLER.
CARL A. MAYER.

Witnesses:
GEORGE GIFFORD,
CHAS. A. RICHTER.